Feb. 19, 1963    N. DE FARIA E CASTRO ETAL    3,077,743
SEMI-CONDUCTOR COOLING DEVICE FOR VEHICLE TIRES
Filed Oct. 23, 1961

INVENTORS
NINA DE FARIA E CASTRO
NICHOLAS DE FARIA E CASTRO

United States Patent Office 3,077,743
Patented Feb. 19, 1963

3,077,743
SEMI-CONDUCTOR COOLING DEVICE FOR
VEHICLE TIRES
Nina de Faria e Castro and Nicholas de Faria e Castro,
both of 611 Elm St., Maywood, N.J.
Filed Oct. 23, 1961, Ser. No. 146,739
4 Claims. (Cl. 62—3)

Our invention relates to semi-conductor devices for cooling tires of moving vehicles.

As is well known, prolonged travel of vehicles at high or even moderate speeds can cause the tires of the vehicle to overheat and fail by puncture or otherwise.

It is an object of our invention to provide a semi-conductor device for cooling tires to prevent overheating.

Another object of our invention is to utilize the Peltier cooling effect in a semi-conductor device to cool tires.

Still another object of our invention is to utilize the cooling afforded by a plurality of thermoelectric elements to prevent overheating of tires as well as other rotating parts.

These and other objects will either be explained or will become apparent hereinafter.

It is known that thermoelectric cells consist of two joined semi-conductors of different conductivity type (i.e. "$n$" and "$p$" types). When an electric current is passed through the cell, one region of the cell becomes hot while another region becomes cool. This effect is known as the Peltier effect.

In our invention, a plurality of discreetly spaced thermoelectric cells are disposed about at least a portion of the outer or inner periphery of a tire with the cool portions of the cells adjacent the tire and the hot portions of the cells remote from the tire. When direct current is supplied to the cells, the tire is cooled and will not overheat.

When the cells are positioned about the outer periphery of the tire, the cells must be supported by that portion of the vehicle body adjacent the tire, and current can be supplied by the battery of the vehicle.

When the cells are positioned about the inner periphery of a tire, they can be supported by the tire and supplied with current from a generator driven by tire rotation.

Reference is now made to the drawings wherein

FIG. 1 shows a prior art thermoelectric cell. When a direct current flows through the cell in a direction indicated by the arrows, portions of the cell become hot or cool as shown.

Figure 1:
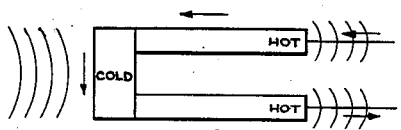
FIG. 1 shows a conventional thermoelectric cell.
Figure 2:
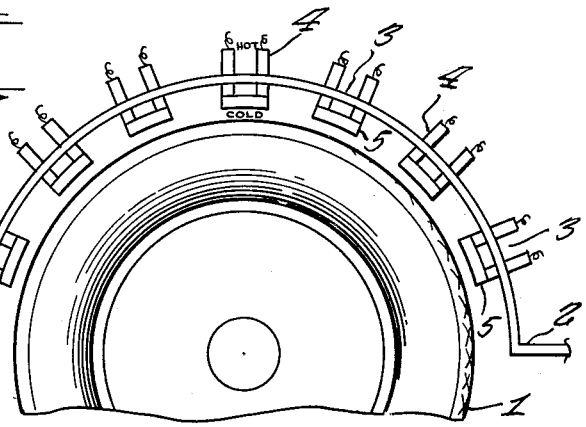
FIG. 2 shows one embodiment of our invention wherein the cells are disposed about the outer periphery of a tire.

FIG. 2 shows a tire 1, an automobile fender 2 protecting the top portion of the tire, and a plurality of equidistantly spaced thermoelectric cells 3 extending through and supported within the fender. The cold regions 5 of cells 3 are positioned between the fender 2 and the tire to cool same. The hot regions 4 of cells 3 are thermally isolated from the tire 1 by being positioned on the top side of the fender 2. Current is supplied to the cells by the battery in the automobile.

Figure 3:
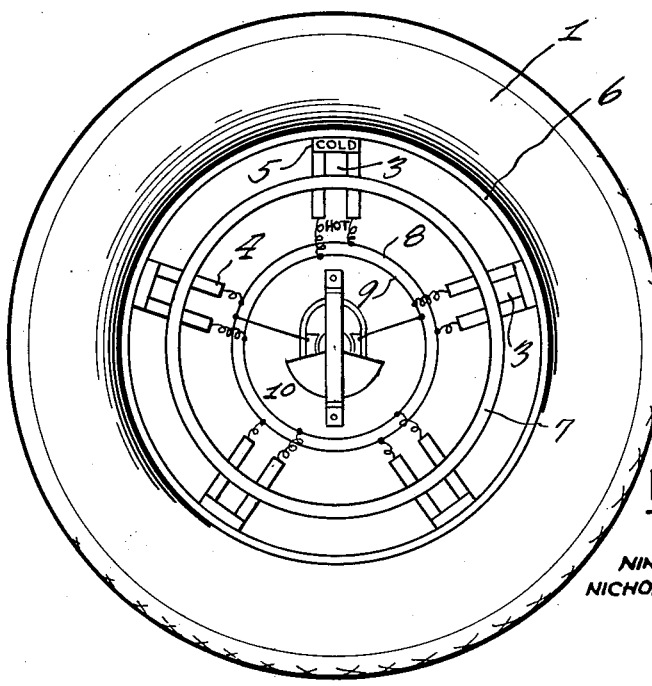
FIG. 3 shows another embodiment of our invention wherein the cells are disposed about the inner periphery of a tire.

In FIG. 3, the cells 3 are built into the shallow space in the wheel under the hub cap with the cold regions 5 in contact with the inner periphery of the tire through the wheel hub 6. The hot regions 4 are thermally isolated from the cold regions 5 by a ring 7 formed for example of asbestos.

In FIG. 3, current is supplied to cells 3 through circular bus bars 8 and 9 from generator 10.

Figure 4:
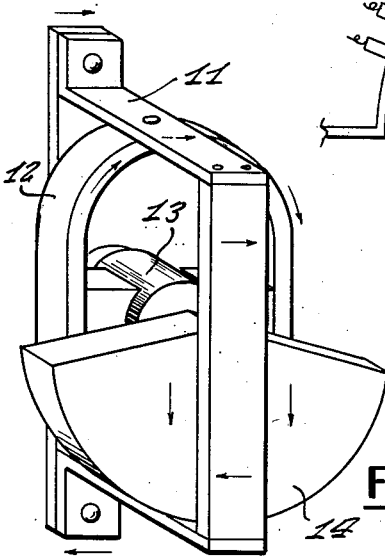
FIG. 4 is a perspective view of the generator shown in cross section.
Figure 5:
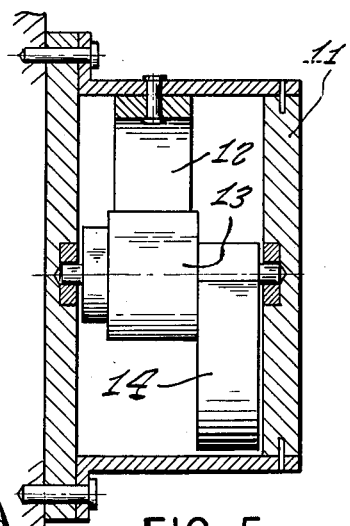
FIG. 5 is a view in cross section of a generator employed in the embodiment of FIG. 3.

Generator 10 as shown in FIGS. 4 and 5 comprises a frame 11 and a magnet 12 which rotate together with the wheel hub 6 of FIG. 3. Generator 10 also includes a winding or armature 13 which is held stationary by a weight 14. Thus the rotation of the wheel hub causes the generator to produce electricity in the manner desired.

While we have shown and pointed out and described the novel concepts of our invention, it will be understood that various omissions, additions and changes can be made without departing from the spirit of our invention. Hence we wish to be limited only by the scope of the claims which follow:

We claim:

1. A semi conductor device for cooling tires and other rotating ring like structures comprising a plurality of thermoelectric cells having hot and cold sections responsive to the passage of an electric current therethrough said cells being mounted on a frame disposed about the periphery of a rotating tire, the said cold sections of the cells being adjacent said tire and the said hot sections being remote from said tire, including means thermally insolating said hot sections from said cold sections.

2. A device as in claim 1 wherein the frame comprises the fender of a car.

3. A semi conductor device for cooling vehicular tires comprising a plurality of thermoelectric cells having hot and cold sections responsive to the passage of electric current through the cells, said cells being mounted on the inner periphery of the tire with the cold section in contact with the said tire and the hot section remote from the said tire including an insulating ring separating the cold sections from the hot sections including means for generating current responsive to the rotation of the tire electrically connected to the said cells.

4. A device as in claim 3 wherein the last said means comprises a generator having a frame affixed to the tire hub and a magnet affixed to said frame in combination with a stationary armature in contact with the said magnet whereby rotation of the said tire results in the generation of current.

References Cited in the file of this patent
UNITED STATES PATENTS

| | | |
|---|---|---|
| 2,388,114 | Boyce | Oct. 30, 1945 |
| 2,443,328 | Sarver | June 15, 1948 |
| 2,565,063 | Briscoe | Aug. 21, 1951 |
| 2,959,018 | Hwang | Nov. 8, 1960 |
| 3,019,609 | Pietsch | Feb. 6, 1962 |